R. V. CONVERSE.
RADIATOR DRAIN VALVE OPERATING DEVICE.
APPLICATION FILED NOV. 25, 1919.
1,368,324.
Patented Feb. 15, 1921.
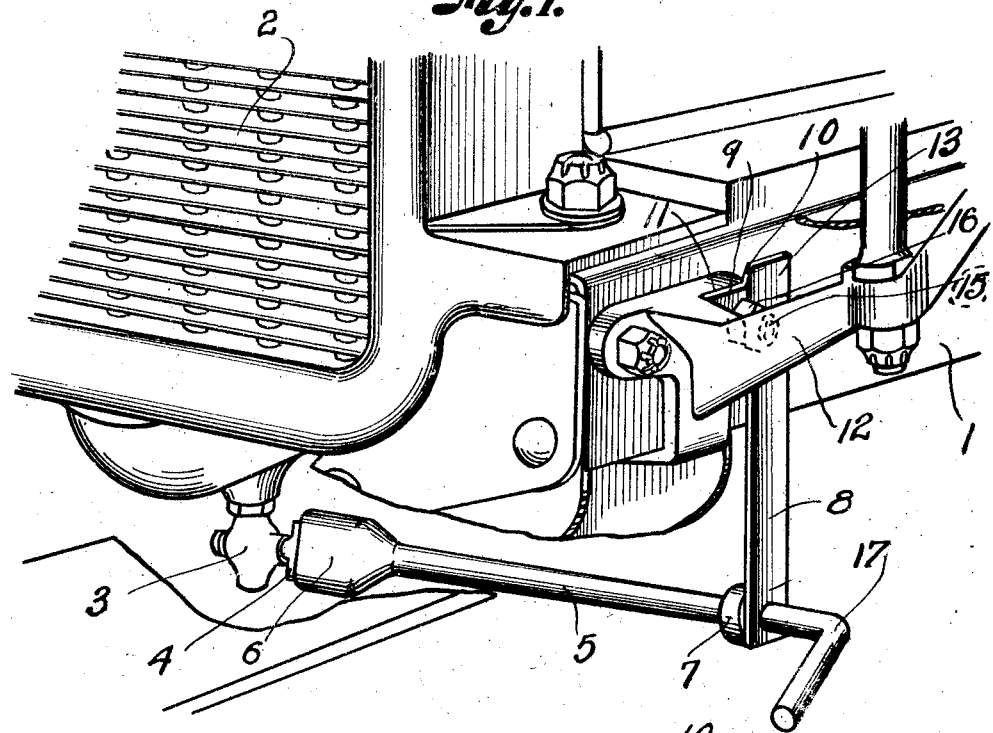
Fig. I.
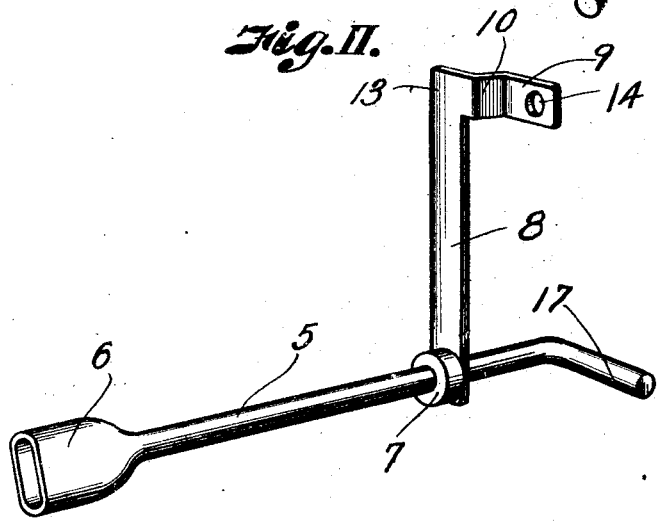
Fig. II.
INVENTOR
Ray V. Converse

UNITED STATES PATENT OFFICE.

RAY V. CONVERSE, OF KANSAS CITY, MISSOURI.

RADIATOR-DRAIN-VALVE-OPERATING DEVICE.

1,368,324. Specification of Letters Patent. Patented Feb. 15, 1921.

Application filed November 25, 1919. Serial No. 340,587.

*To all whom it may concern:*

Be it known that I, RAY V. CONVERSE, a citizen of the United States, residing at Kansas City, in the county of Jackson and State of Missouri, have invented certain new and useful Improvements in Radiator-Drain-Valve-Operating Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a handle for turning the pet cock of a radiator drain on motor vehicles and one of the objects thereof is to provide a simple, durable and efficient handle which may be conveniently attached to the pet cock of a motor vehicle radiator drain, there being provided means for maintaining the handle in its operative position with respect to the pet cock turning plug head, the handle being accessible from the side of the vehicle whereby the radiator may be drained without the necessity of the operator being in close proximity to the drain.

I have also provided means whereby the handle may be attached to a motor vehicle without the necessity for providing special attaching appliances, the illustrating embodiment showing the manner of attaching the handle to a vehicle through one of the bolts for the mud guard bracket adjacent to the front of the machine.

In the drawings,

Figure I is a fragmentary perspective view of a motor vehicle to which my invention is attached, and Fig. II is a detail perspective view of the handle and its support.

Referring now to the drawings by numerals of reference:

1 designates a motor vehicle provided with a radiator 2 having a drain or pet cock 3 consisting of a casing and a turning plug, on one end of which is a head 4. The handle for turning the pet cock is illustrated in detail in Fig. II as comprising the illustrated rod or bar 5, on one end of which is a pet cock head-engaging jaw, illustrated as a socket 6 to fit over the head 4, as clearly illustrated in Fig. I.

In actual practice, it is recommended that the rod or bar 5 be of sufficient length to extend to the side of the vehicle, as shown in Fig. I, the rod being provided with a collar or annular projection 7 and said rod extending through a supporting bracket or arm 8 having a right-angular projection 9, off-set from the arm 8 by a web 10, as clearly illustrated in Fig. II. The off-set portion is adapted to lie against the face 11 of the mud guard bracket 12, the end 13 of the bracket 8 being adapted to rest against the side of the chassis of the motor vehicle, as clearly seen by reference to Fig. I. The off-set portion 9 is provided with a bolt-receiving opening 14, adapted to fit over the bolt 15 which assists in securing the bracket 12 in place and when the bracket 8 is in the position shown in Fig. I, with the opening 14 fitted over the bolt 15, it may be secured fixedly with respect to the bracket 12 by a nut 16 so that it will be rigid with respect to the frame, the off-set portion preventing a swinging movement thereof since the web 10 will rest against the end of the bracket 12, as will be apparent by reference to the illustration.

When the parts are in the position shown in Fig. I, there can be no longitudinal movement of the rod or shaft 5 since any tendency for longitudinal movement away from the head 4 will be opposed by contact of the collar 7 and bracket 8. A rotative movement may be readily imparted to the handle, however, through the medium of its crank 17, which is adapted to be grasped by the hand of the operator and swung in a vertical plane so as to impart a rotative movement to the shaft 5 in either direction and thereby open or close the pet cock 3.

From the foregoing it will be apparent that in order to attach the device, it will be necessary only to unscrew the nut 16 from the bolt 15 and apply the bracket, as shown in Fig. I, being sure that the head-engaging end or socket 6 fits over the head 4 of the pet cock. Then any liability of the parts becoming deranged will be eliminated because the collar or annular projection 7 will prevent longitudinal movement of the rod or bar away from the pet cock, so, obviously, the parts will be in operative position, it being necessary only to swing the crank 17 in either direction desired, dependent upon whether the pet cock 3 is to be closed or opened.

It will also be apparent that the crank 17 will be conveniently accessible to the motorist, but since it extends under the mud guard, liability of accidents due to projecting ends, etc., will be eliminated.

What I claim and desire to secure by Letters-Patent is:

1. An operating device for radiator drain valves comprising a bracket consisting of an arm having an off-set mud guard-supporting-bracket-engaging portion and a part to rest against the chassis of the motor vehicle, said bracket having at its opposite end an opening forming a shaft bearing, a rotatable shaft projecting through said bearing, and a turning-plug-head engaging portion on the end of said shaft.

2. The combination with a motor vehicle having a mud guard supporting bracket near its forward end and a radiator provided with a pet cock for drainage, of a bracket comprising a vertical arm having off-set portions, one of which bears against the side of the chassis of the motor vehicle and the other of which rests against the face of the mud guard bracket, said arm being secured to the mud guard bracket by the fastening device which secures the mud guard bracket to the chassis, a rotatable shaft journaled in the depending end of said bracket, and a pet cock-engaging member being carried by said shaft.

3. The combination with a motor vehicle having a mud guard supporting bracket near its forward end and a radiator provided with a pet cock for drainage, of a bracket comprising a vertical arm having off-set portions, one of which bears against the side of the chassis of the motor vehicle and the other of which rests against the face of the mud guard bracket, said arm being secured to the mud guard bracket by the fastening device which secures the mud guard bracket to the chassis, a rotatable shaft journaled in the depending end of said bracket, a pet cock-engaging member carried by said shaft, and a stop collar on the shaft and bearing against the inner face of said bracket.

In testimony whereof I affix my signature.

RAY V. CONVERSE.